United States Patent
Deng et al.

(10) Patent No.: US 8,917,755 B2
(45) Date of Patent: Dec. 23, 2014

(54) METHOD AND APPARATUS FOR GENERATING BROADCAST POSITIONING SIGNAL, AND POSITIONING METHOD

(75) Inventors: Zhongliang Deng, Beijing (CN); Ziping Lv, Beijing (CN); Huli Shi, Beijing (CN); Weiguo Guan, Beijing (CN); Yanpei Yu, Beijing (CN); Hemin Li, Beijing (CN); Qifeng Lai, Beijing (CN); Yaoyu Deng, Beijing (CN); Wen Liu, Beijing (CN)

(73) Assignees: Beijing University of Posts and Telecommunications, Beijing (CN); Beijing Shoukexintong Science & Technology Co., Ltd., Beijing (CN)

( * ) Notice: Subject to any disclaimer, the term of this patent is extended or adjusted under 35 U.S.C. 154(b) by 30 days.

(21) Appl. No.: 13/879,949

(22) PCT Filed: Jun. 8, 2011

(86) PCT No.: PCT/CN2011/075458
§ 371 (c)(1),
(2), (4) Date: Apr. 18, 2013

(87) PCT Pub. No.: WO2012/051860
PCT Pub. Date: Apr. 26, 2012

(65) Prior Publication Data
US 2013/0343432 A1    Dec. 26, 2013

(30) Foreign Application Priority Data
Oct. 18, 2010    (CN) .......................... 2010 1 0517356

(51) Int. Cl.
*H04B 1/00*    (2006.01)
*H04W 24/00*    (2009.01)
*H04L 5/00*    (2006.01)
*H04L 27/26*    (2006.01)

(52) U.S. Cl.
CPC .............. *H04W 24/00* (2013.01); *H04L 5/0007* (2013.01); *H04L 27/2602* (2013.01)
USPC ........................................... 375/130; 375/295

(58) Field of Classification Search
USPC ......................................... 375/130, 260, 395
See application file for complete search history.

(56) References Cited

U.S. PATENT DOCUMENTS 6,256,508 B1 *   7/2001   Nakagawa et al. ........... 370/312
7,701,388 B2    4/2010   Shyr et al.
(Continued)

FOREIGN PATENT DOCUMENTS

| CN | 1547671 A | 11/2004 |
| CN | 1921576 A | 2/2007 |

(Continued)

OTHER PUBLICATIONS

Sep. 15, 2011 International Search Report issued in International Application No. PCT/CN2011/075458 (with translation).

*Primary Examiner* — Sam K Ahn
*Assistant Examiner* — Janice Tieu
(74) *Attorney, Agent, or Firm* — Oliff PLC (57) ABSTRACT

The present invention, pertaining to the field of mobile broadcast television technologies, discloses a method and apparatus for generating a broadcast positioning signal, and a positioning method. According to the present invention, a broadcast positioning signal is generated by inserting a spread spectrum signal and a first spread spectrum signal in an orthogonal frequency-division multiplexing (OFDM) signal, and a receiver is positioned according to broadcast positioning signals from at least three different senders.

10 Claims, 4 Drawing Sheets

(56) References Cited

U.S. PATENT DOCUMENTS

| | | |
|---|---|---|
| 7,813,383 B2 | 10/2010 | Wang et al. |
| 8,340,153 B2 * | 12/2012 | Tsai et al. .................. 375/131 |
| 2004/0174812 A1 * | 9/2004 | Murakami et al. ............ 370/215 |
| 2006/0250937 A1 | 11/2006 | Wang et al. |
| 2007/0109184 A1 | 5/2007 | Shyr et al. |
| 2010/0171660 A1 | 7/2010 | Shyr et al. |
| 2011/0080924 A1 | 4/2011 | Wang et al. |

FOREIGN PATENT DOCUMENTS

| | | |
|---|---|---|
| CN | 1976531 A | 6/2007 |
| CN | 101194480 A | 6/2008 |
| CN | 101616482 A | 12/2009 |
| CN | 101977172 A | 2/2011 |

* cited by examiner

METHOD AND APPARATUS FOR GENERATING BROADCAST POSITIONING SIGNAL, AND POSITIONING METHOD

This application claims priority to Chinese Patent Application No. 201010517356.4, filed with Chinese Patent Office on Oct. 18, 2010 and entitled "METHOD AND APPARATUS FOR GENERATING BROADCAST POSITIONING SIGNAL, AND POSITIONING METHOD", which is incorporated herein by reference in its entirety.

FIELD OF THE INVENTION

The present invention relates to the field of mobile broadcast television technologies, and particularly, to a method and apparatus for generating a broadcast positioning signal, and a positioning method.

BACKGROUND OF THE INVENTION

In recent years, people's demands on outdoor and indoor accurate positioning are increasing. Especially in emergent cases, accurate positioning becomes more important. The positioning technologies in the prior art mainly include: global positioning system (GPS), location based services, and the like.

During the implementation of the present invention, the inventors find that the prior art has at least the following problems:

The GPS positioning requires communication with satellites, and therefore, the conventional GPS positioning terminal is costly.

In the location based services, communication with the base station is required, and therefore the mobile terminal needs to have the positioning function. However, most mobile terminals do not have the positioning function. In this way, regardless of upgrade in the existing mobile terminal or use of a new mobile terminal, the cost will be increased. In addition, if a large number of mobile terminals communicate with the base station for positioning, communication resources will be occupied.

SUMMARY OF THE INVENTION

To accurately identify and solves the problem that the GPS positioning method and mobile terminal base station positioning method in the prior art are costly and consumes communication resources, embodiments of the present invention provide a method for generating broadcast positioning signal, a positioning method, an apparatus for generating a broadcast positioning signal, an exciter, and a transmitter. The technical solutions are as follows:

An embodiment of the present invention provides a method for generating a broadcast positioning signal, where the method includes:

receiving a data stream, performing forward error correction coding and orthogonal frequency-division multiplexing (OFDM) modulation on the data stream, and generating an OFDM signal and a first spread spectrum signal;

performing spread spectrum modulation on preset message bit information according to the first spread spectrum signal to generate a spread spectrum modulation signal; and inserting one or more than one spread spectrum modulation signal and one or more than one first spread spectrum signal in a transmitter identifier signal and a first synchronization signal in each time slot of the OFDM signal, to generate a broadcast positioning signal.

Specifically, the inserting one or more than one spread spectrum modulation signal and one or more than one first spread spectrum signal in a transmitter identifier signal and a first synchronization signal in each time slot of the OFDM signal, to generate a broadcast positioning signal specifically includes:

padding a preset number of spread spectrum modulation signals in the transmitter identifier signal and the first synchronization signal in each time slot of the OFDM signal, and inserting the first spread spectrum signal.

Furthermore, the method further includes:

performing pre-calibration and digital-to-analog conversion on the broadcast positioning method to obtain an analog radio frequency signal; and performing power amplification on the analog radio frequency signal to generate a radio frequency signal, and filtering the radio frequency signal.

An embodiment of the present invention provides a positioning method using the method for generating a broadcast positioning signal, wherein the positioning method includes:

generating, by a sender, a broadcast positioning signal, and broadcasting the signal; and positioning, by a receiver, the receiver according to the broadcast positioning signals broadcasted by at least three different senders and coordinates of the three different senders.

An embodiment of the present invention provides an apparatus for generating a broadcast positioning signal, where the apparatus includes:

a coding and modulation module, configured to receive a data stream, and perform forward error correction coding and OFDM modulation on the data stream to generate an OFDM signal;

a spread spectrum code generation module, configured to generate a first spread spectrum signal;

a spread spectrum modulation module, configured to perform spread spectrum modulation on preset message bit information according to the first spread spectrum signal to generate a spread spectrum modulation signal; and an inserting and framing module, configured to: receive the OFDM signal sent by the coding and modulation module, the first spread spectrum signal sent by the spread spectrum code generation module, and the spread spectrum modulation signal sent by the spread spectrum modulation module; and insert one or more than one spread spectrum modulation signal and one or more than one first spread spectrum signal in a transmitter identifier signal and a first synchronization signal in each time slot of the OFDM signal, to generate a broadcast positioning signal.

Specifically, the inserting and framing module includes:

a receiving unit, configured to receive the OFDM signal sent by the coding and modulation module, the first spread spectrum signal sent by the spread spectrum code generation module, and the spread spectrum modulation signal sent by the spread spectrum modulation module; and a generation unit, configured to pad a preset number of spread spectrum modulation signals in the transmitter identifier signal and the first synchronization signal in each time slot of the OFDM signal, and insert the first spread spectrum signal to generate the broadcast positioning signal.

Furthermore, the apparatus for generating a broadcast positioning signal further includes a clock and synchronization module, configured to send a synchronization signal to the coding and modulation module, or send a rubidium atomic clock signal to the coding and modulation module, or send a timing signal to the coding and modulation module.

An embodiment of the present invention provides an exciter using the apparatus for generating a broadcast positioning signal, where the exciter includes: an apparatus for generating a broadcast positioning signal and further includes:

a digital pre-calibration module, configured to pre-calibrate a broadcast positioning signal generated by the apparatus for generating a broadcast positioning signal.

Furthermore, the exciter further includes:

an I/Q modulation and up-conversion module, configured to perform I/Q modulation and up-conversion on the pre-calibrated broadcast positioning signal sent by the digital pre-calibration module to generate an analog radio frequency signal;

a power amplification module, configured to perform power amplification on the analog radio frequency signal sent by the I/Q modulation and up-conversion module to output a radio frequency signal; and a filtering module, configured to filter the radio frequency signal sent by the power amplification module.

An embodiment of the present invention provides a transmitter using an exciter as described above, where the transmitter includes an exciter and further includes:

a transmitting module, configured to transmit a broadcast positioning signal pre-calibrated by the exciter.

The technical solutions provided in the embodiments of the present invention achieve the following beneficial effects:

A broadcast positioning signal is generated by inserting a spread spectrum modulation signal and a first spread spectrum signal in a transmitter identifier signal and a first synchronization signal in each time slot of an OFDM signal. Since the spread spectrum modulation signal is inserted in the OFDM signal, a receiver is capable of accurately capturing and tracing the broadcast positioning signal, thereby implementing the positioning function. Meanwhile, the unmodulated first spread spectrum signal is inserted in the OFDM signal, and hence broadcast positioning signals in a next time slot are isolated, thereby preventing interference in signals. In addition, the receiver receives the sender according to the broadcast positioning signals broadcasted by at least three different senders, and the receiver is positioned according to the broadcast positioning signals and coordinates of the three different senders.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person skilled in the art can derive other accompanying drawings from these accompanying drawings without any creative efforts.

DETAILED DESCRIPTION OF THE EMBODIMENTS

To make the objectives, technical solutions, and advantages of the present invention clearer, the following describes the embodiments of the present invention in detail with reference to the accompanying drawings.

At present, television stations in provinces, cities and counties have already constructed a nation-wide broadcast and television network. The exciters of China Mobile Multimedia Broadcasting (CMMB)/Digital Audio Broadcasting (DAB) provide universal services such as television, broadcast, emergency broadcast, web page browsing, weather report, stock quotation, and government affair information for mobile phone television users anywhere and anytime. Therefore, the design idea of the present invention is to use the ubiquitous broadcast and television network for positioning, to save limited wireless communication resources and reduce the cost.

Embodiment 1

Figure 1:
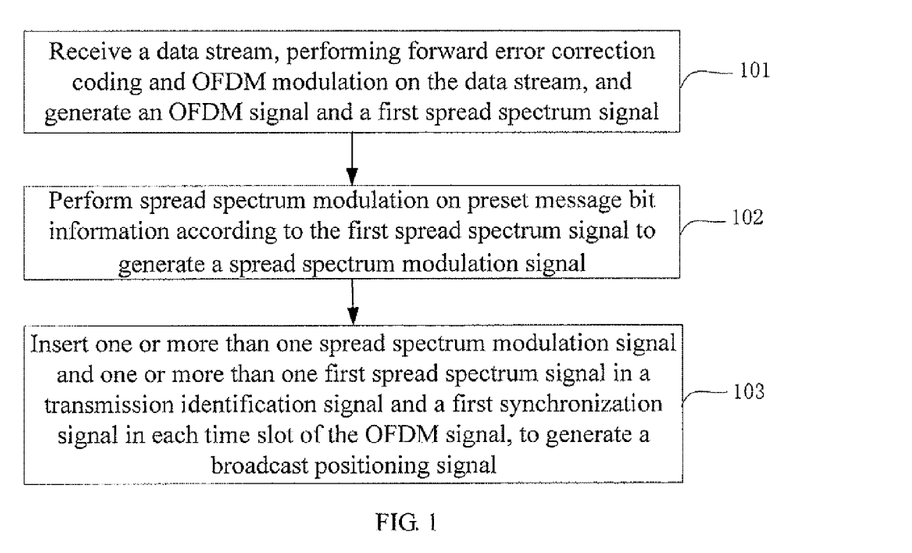
FIG. 1 is a flowchart of a method for generating a broadcast positioning signal according to Embodiment 1 of the present invention.

Referring to FIG. 1, an embodiment of the present invention provides a method for generating a broadcast positioning signal, where the method specifically includes the following steps:

101: receiving a data stream, performing forward error correction coding and orthogonal frequency-division multiplexing (OFDM) modulation on the data stream, and generating an OFDM signal and a first spread spectrum signal;

102: performing spread spectrum modulation on preset message bit information according to the first spread spectrum signal to generate a spread spectrum modulation signal; and

103: inserting one or more than one spread spectrum modulation signal and one or more than one first spread spectrum signal in a transmitter identifier signal and a first synchronization signal in each time slot of the OFDM signal, to generate a broadcast positioning signal.

Each time slot of the OFDM signal sequentially includes a transmitter identifier signal (TXID), two synchronization signals, and several OFDM symbols. In practical applications, even if a preset time segment of a first synchronization signal or a first synchronization signal is absent, synchronization and channel estimation can still be performed. Therefore, according to the embodiments of the present invention, a spread spectrum modulation signal and a spread spectrum code are inserted in the TXID and the first synchronization signal to implement positioning.

According to the method provided in the embodiments of the present invention, a broadcast positioning signal is generated by inserting a spread spectrum modulation signal and a first spread spectrum signal in a transmitter identifier signal and a first synchronization signal connecting the transmitter identifier signal in each time slot of an OFDM signal. Since the spread spectrum modulation signal is inserted in the OFDM signal and the broadcast positioning signal is generated, a receiver is capable of accurately capturing and tracing the broadcast positioning signal, thereby implementing the positioning function. Meanwhile, the unmodulated first spread spectrum signal is inserted in the OFDM signal, and hence broadcast positioning signals in the next time slot are isolated, thereby preventing interference between signals.

Embodiment 2

Figure 2:
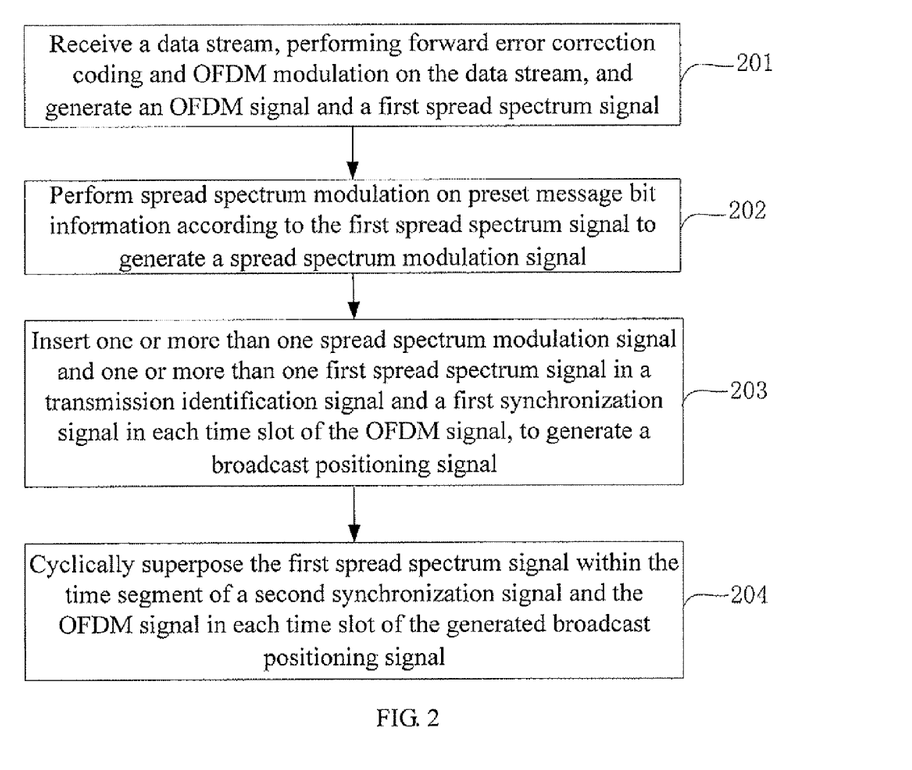
FIG. 2 is a flowchart of another method for generating a broadcast positioning signal according to Embodiment 2 of the present invention.

Referring to FIG. 2, an embodiment of the present invention provides a method for generating a broadcast positioning signal, where the method specifically includes the following steps:

201: receiving a data stream, performing forward error correction coding and OFDM modulation on the data stream, and generating an OFDM signal and a first spread spectrum signal.

Specifically, an input data stream is received, forward error correct coding, interleaving, and castellation mapping are performed on the data stream, the signal after castellation mapping is multiplexed with a discrete pilot and a continuous pilot for OFDM modulation, to generate the OFDM signal.

The forward error correction coding, interleaving, and castellation mapping on a data stream, and OFDM modulation on a data stream pertain to mature existing technologies, which are not detailed in the embodiments of the present invention. The present invention only uses binary phase shift keying (BPSK) castellation mapping as an example for illustration. In practical applications, quadrature phase shift keying (QPSK) or quadrature amplitude modulation (16-QAM) castellation mapping may also be adopted.

The first spread spectrum signal is used for spreading spectrum and modulation to generate a spread spectrum and modulation signal. The first spread spectrum signal may also be sent together with the OFDM signal within the entire time segment in the same frequency. Upon receiving the first spread spectrum signal, the receiver performs accurate capture during pseudo code ranging.

The embodiments of the present invention do not limit the manner of generating the first spread spectrum signal and the format of the first spread spectrum signal. The first spread spectrum signal may be a Gold code. The embodiments of the present invention use a 511 bits-per-period Gold code serving as the first spread spectrum signal as an example for illustration. In practical applications, the first spread spectrum signal may also be a Gold code with another number of bits-per-period, for example, a 1023-bit code division multiple access (CDMA) spread spectrum code, a 127-bit spread spectrum code, and the like.

Preferably, the power for sending the first spread spectrum signal is 20 dB smaller than the power for sending the OFDM signal, to prevent the first spread spectrum signal from causing interference to the generated OFDM signal.

202: performing spread spectrum modulation on preset message bit information according to the first spread spectrum signal to generate a spread spectrum modulation signal.

Specifically, still the BPSK castellation mapping is used as an example for illustration, a BPSK spread spectrum modulation signal is generated by multiplying the received first spread spectrum signal by preset message bit information to implement spread spectrum modulation.

203: inserting one or more than one spread spectrum modulation signal and one or more than one first spread spectrum signal in a transmitter identifier signal and a first synchronization signal in each time slot of the OFDM signal, to generate a broadcast positioning signal.

Specifically, a preset number of spread spectrum modulation signals are padded in the transmitter identifier signal and the first synchronization signal connecting the transmitter identifier signal in each time slot of the OFDM signal, and the first spread spectrum signal is inserted to generate the broadcast positioning signal.

According to the embodiments of the present invention, a broadcast positioning signal is generated by inserting a spread spectrum modulation signal and a first spread spectrum signal in a transmitter identifier signal and a first synchronization signal connecting the transmitter identifier signal of an OFDM signal. The embodiments of the present invention do not limit the number and position of inserted spread spectrum modulation signals and first spread spectrum signals. According to the embodiments of the present invention, it is only ensured that at least one spread spectrum modulation signal and at least one spread spectrum code are inserted in the transmitter identifier signal and the first synchronization signal connecting the transmitter identifier signal in each time slot of the OFDM signal. Preferably, a preset number of spread spectrum modulation signals are firstly padded, and then one or more than one spread spectrum code is inserted, to generate the broadcast positioning signal. Since the spread spectrum modulation signals are inserted in the OFDM signal, a receiver is capable of accurately capturing and tracing the broadcast positioning signal, thereby implementing the positioning function. Meanwhile, the unmodulated first spread spectrum signal is inserted in the OFDM signal, and hence broadcast positioning signals in a next time slot are isolated, thereby preventing interference between signals.

Figure 6:
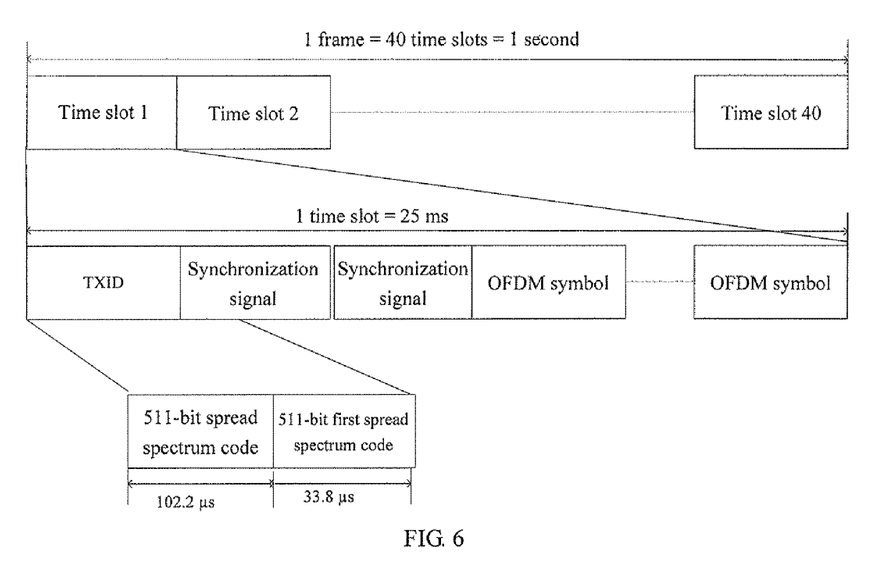
FIG. 6 is a working principle diagram of spread spectrum modulation signal inserting and framing module according to Embodiment 5 of the present invention.

With regard to each time slot in the OFDM signal, the duration of the TXID signal is 36 µs. The embodiments of the present invention still use a 511-bit Gold code serving as the first spread spectrum signal as an example for illustration. The duration of the first spread spectrum signal is 33.8 µs, and the duration of the generated spread spectrum modulation signal is 102.2 µs. Referring to FIG. 6, the duration of one frame is 1 s, each frame has 40 time slots, and the spread spectrum modulation signal and the first spread spectrum signal are inserted within the time segment of the TXID signal and the first 100 µs of synchronization signal. Preferably, another spread spectrum modulation signal and another spread spectrum code may also be inserted into the remaining duration of the first synchronization signal. To be specific, the remaining duration of the first synchronization signal may be inserted with a preset number of spread spectrum modulation signals or a preset number of first spread spectrum signals, or the first synchronization signal may be fully inserted, which is not limited in the embodiments of the present invention.

204: cyclically superposing the first spread spectrum signal within the time segment of a second synchronization signal and the OFDM signal in each time slot of the generated broadcast positioning signal.

The first spread spectrum signal is superposed over the broadcast positioning signal concurrently and cyclically, which does not affect the waveform of the broadcast positioning signal. In this way, the broadcast positioning signal and the cyclically superposed first spread spectrum signal are broadcast concurrently, so that the receiver receives the cyclically superposed first spread spectrum signal and thus accurate positioning is implemented.

Preferably, the embodiments of the present invention further include: generating a second spread spectrum code, and cyclically superposing the second spread spectrum code within the time segment of the second synchronization signal and the OFDM signal in each time slot of the generated broadcast positioning signal. The second spread spectrum code is superposed over the broadcast positioning signal concurrently and cyclically, which does not affect the waveform of the broadcast positioning signal. In this way, the broadcast positioning signal and the cyclically superposed second spread spectrum code are broadcast concurrently, so that the receiver receives the cyclically superposed second spread spectrum code and thus accurate positioning is implemented.

Furthermore, the method includes:

performing pre-calibration and digital-to-analog conversion on the broadcast positioning method to obtain an analog radio frequency signal; and performing power amplification on the analog radio frequency signal to generate a radio frequency signal, and filtering the radio frequency signal.

According to the method provided in the embodiments of the present invention, a broadcast positioning signal is generated by inserting a spread spectrum modulation signal and a first spread spectrum signal in a transmitter identifier signal and a first synchronization signal connecting the transmitter identifier signal in each time slot of an OFDM signal. Since the spread spectrum modulation signal is inserted in the OFDM signal and the broadcast positioning signal is generated, a receiver is capable of accurately capturing and tracing the broadcast positioning signal, thereby implementing the positioning function. Meanwhile, the unmodulated first spread spectrum signal is inserted in the OFDM signal, and hence broadcast positioning signals in a next time slot are isolated, thereby preventing interference between signals.

Embodiment 3

Figure 3:
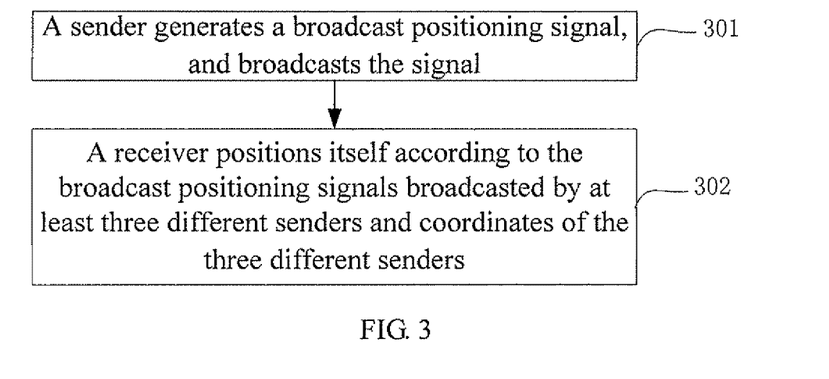
FIG. 3 is a flowchart of a positioning method according to Embodiment 3 of the present invention.

Referring to FIG. 3, an embodiment of the present invention provides a positioning method using the method for generating a broadcast positioning signal according to the above embodiments, where the positioning method specifically includes:

301: generating, by a sender, a broadcast positioning signal, and broadcasting the signal; and 302: positioning, by a receiver, the receiver according to the broadcast positioning signals broadcasted by at least three different senders and coordinates of the three different senders.

The embodiments of the present invention do not limit the manner of acquiring coordinates of the sender by the receiver according to the received broadcast positioning signal. For details about the steps thereof, reference may be made to disclosure contained in Chinese patent application with publication No. 101616482A. According to the embodiments of the present invention, by using the principle of three-point positioning, the receiver is positioned according to coordinates of three different senders.

According to the positioning method provided in the embodiments of the present invention, a receiver receives a broadcast positioning signal sent by a sender, and the distance between the sender to the receiver can be obtained according to the broadcast positioning signal. Hence, the receiver is positioned according to the principle of three-point positioning.

Embodiment 4

Figure 4:
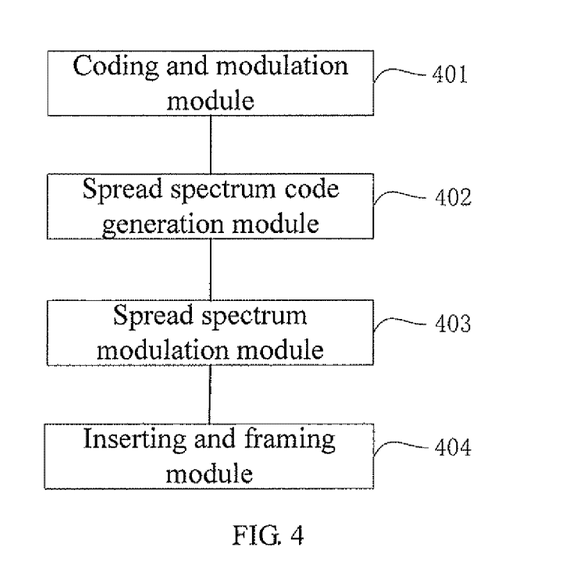
FIG. 4 is a schematic diagram of an apparatus for generating a broadcast positioning signal according to Embodiment 4 of the present invention.

Referring to FIG. 4, an embodiment of the present invention provides an apparatus for generating a broadcast positioning signal, where the apparatus includes:

a coding and modulation module 401, configured to receive a data stream, and perform forward error correction coding and OFDM modulation on the data stream to generate an OFDM signal;

a spread spectrum code generation module 402, configured to generate a first spread spectrum signal;

a spread spectrum modulation module 403, configured to perform spread spectrum modulation on preset message bit information according to the first spread spectrum signal to generate a spread spectrum modulation signal; and an inserting and framing module 404, configured to: receive the OFDM signal sent by the coding and modulation module 401, the first spread spectrum signal sent by the spread spectrum code generation module 402, and the spread spectrum modulation signal sent by the spread spectrum modulation module 403; and insert one or more than one spread spectrum modulation signal and one or more than one first spread spectrum signal in a transmitter identifier signal and a first synchronization signal in each time slot of the OFDM signal, to generate a broadcast positioning signal.

According to the apparatus for generating a broadcast positioning signal provided in the embodiments of the present invention, a broadcast positioning signal is generated after the inserting and framing module inserts a spread spectrum modulation signal and a first spread spectrum signal. Since the spread spectrum modulation signal is inserted in the OFDM signal and the broadcast positioning signal is generated, a receiver is capable of accurately capturing and tracing the broadcast positioning signal, thereby implementing the positioning function. Meanwhile, the unmodulated first spread spectrum signal is inserted in the OFDM signal, and hence broadcast positioning signals in a next time slot are isolated, thereby preventing interference between signals.

Embodiment 5

Figure 5:
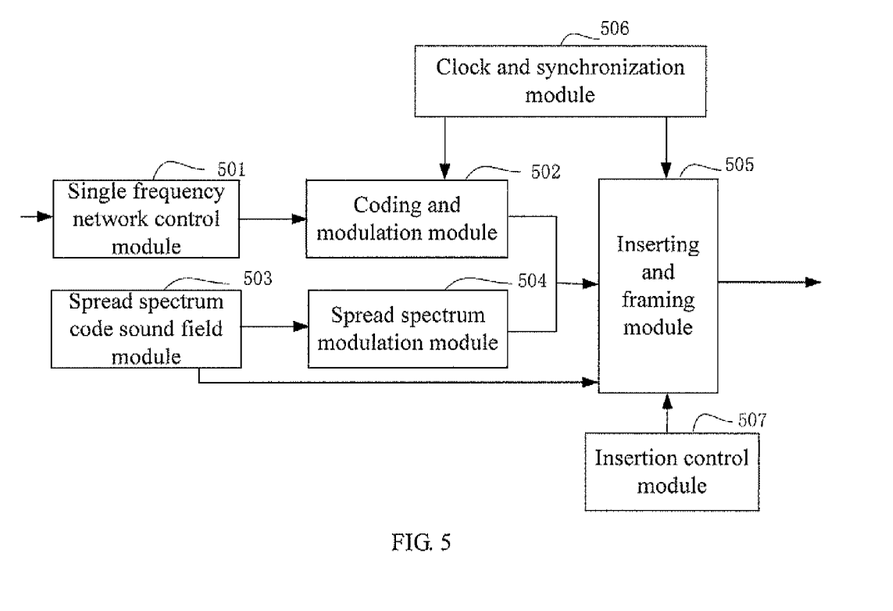
FIG. 5 is a schematic diagram of another apparatus for generating a broadcast positioning signal according to Embodiment 5 of the present invention.

Referring to FIG. 5, an embodiment of the present invention provides an apparatus for generating a broadcast positioning signal, where the apparatus includes: a single frequency network control module 501, a coding and modulation module 502, a spread spectrum code generation module 503, a spread spectrum modulation module 504, and an inserting and framing module 505.

The single frequency network control module 501 is configured to send a data stream to the coding and modulation module 502.

The coding and modulation module 502 is electrically connected to the single frequency network control module 501, and is configured to perform forward error correction coding and OFDM modulation on the received data stream to generate an OFDM signal.

Specifically, the coding and modulation module 502 receives the data stream sent by the single frequency network control module 501, performs forward error correct coding, interleaving, and castellation mapping on the data stream, multiplexes the signal after castellation mapping with a discrete pilot and a continuous pilot for OFDM modulation, to generate the OFDM signal.

The forward error correction coding, interleaving, and castellation mapping on a data stream, and OFDM modulation on a data stream pertain to mature existing technologies, which are not detailed in the embodiments of the present invention. The present invention only uses BPSK castellation mapping as an example for illustration. In practical applications, QPSK or 16-QAM castellation mapping may also be adopted.

Furthermore, the coding and modulation module 502 further receives a clock synchronization signal sent by the clock and synchronization module 506, thereby realizing clock input during the positioning process. Preferably, the clock synchronization signal uses a rubidium atomic clock frequency or a ku wave band timing signal, to realize high-precision synchronization, where the ku wave band timing signal refers to a signal received from a satellite.

The spread spectrum code generation module 503 is configured to generate a first spread spectrum signal.

The first spread spectrum signal is used for spreading and modulation by the spread spectrum modulation module 504 to generate a spread spectrum and modulation signal. The first spread spectrum signal may also be sent together with the OFDM signal within the entire time segment in the same frequency. Upon receiving the first spread spectrum signal, the receiver performs accurate capture during pseudo code ranging.

The embodiments of the present invention do not limit the manner of generating the first spread spectrum signal and the format of the first spread spectrum signal. The first spread spectrum signal may be a Gold code. The embodiments of the present invention use a 511 bits-per-period Gold code serving as the first spread spectrum signal as an example for illustration. In practical applications, the first spread spectrum signal may also be a Gold code with another number of bits-per-period, for example, 1023-bit code division multiple access (CDMA) spread spectrum code, a 127-bit spread spectrum code, and the like.

Preferably, the power for sending the first spread spectrum signal is 20 dB smaller than the power for sending the OFDM signal, to prevent the first spread spectrum signal from causing interference to the OFDM signal output from the coding and modulation module 502.

The spread spectrum modulation module 504 is electrically connected to the spread spectrum code generation module 503, and is configured to perform spread spectrum modulation on preset message bit information according to the first spread spectrum signal generated by the spread spectrum code generation module 503, to generate a spread spectrum modulation signal.

Specifically, still the BPSK castellation mapping is used as an example for illustration, a BPSK spread spectrum modulation signal is generated after the spread spectrum modulation module 504 multiplies the received first spread spectrum signal by preset message bit information to implement spread spectrum modulation.

The inserting and framing module 505 is electrically connected to the coding and modulation module 502, the spread spectrum code generation module 503, and the spread spectrum modulation module 504; and is configured to: receive the OFDM signal sent by the coding and modulation module 502, the first spread spectrum signal sent by the spread spectrum generation module 503, and the spread spectrum modulation signal sent by the spread spectrum modulation module 504; and insert one or more than one spread spectrum modulation signal and one or more than one first spread spectrum signal in a transmitter identifier signal and a first synchronization signal in each time slot of the OFDM signal, to generate a broadcast positioning signal.

Specifically, each time slot of the OFDM signal sequentially includes a TXID signal, two synchronization signals, and several OFDM symbols. In practical applications, even if a preset time segment of a first synchronization signal or a first synchronization signal is absent, synchronization and channel estimation can still be performed. Therefore, according to the embodiments of the present invention, a spread spectrum modulation signal and a spread spectrum code are inserted in the TXID and the first synchronization signal to implement positioning.

Preferably, the inserting and framing module 505 according to the embodiments of the present invention specifically includes:

a receiving unit, configured to receive the OFDM signal sent by the coding and modulation module 502, the first spread spectrum signal sent by the spread spectrum code generation module 503, and the spread spectrum modulation signal sent by the spread spectrum modulation module 504; and a generation unit, configured to pad a preset number of spread spectrum modulation signals in the transmitter identifier signal and the first synchronization signal in each time slot of the OFDM signal, and insert the first spread spectrum signal to generate the broadcast positioning signal.

According to the embodiments of the present invention, a broadcast positioning signal is generated by inserting a spread spectrum modulation signal and a first spread spectrum signal in a transmitter identifier signal of an OFDM signal and the first synchronization signal connecting the transmitter identifier signal. The embodiments of the present invention do not limit the number of inserted spread spectrum modulation signals and first spread spectrum signals, and the position where the signals and codes are inserted. According to the embodiments of the present invention, it is only ensured that at least one spread spectrum modulation signal and at least one spread spectrum code are inserted in the transmitter identifier signal and the first synchronization signal connecting the transmitter identifier signal in each time slot of the OFDM signal. Preferably, a preset number of spread spectrum modulation signals are padded, and then one or more than one spread spectrum code is inserted. Since the spread spectrum modulation signals are inserted in the OFDM signal, a receiver is capable of accurately capturing and tracing the broadcast positioning signal, thereby implementing the positioning function. Meanwhile, the unmodulated first spread spectrum signal is inserted in the OFDM signal, and hence broadcast positioning signals in a next time slot are isolated, thereby preventing interference between signals.

With regard to each time slot in the OFDM signal, the duration of the TXID signal is 36 μs. The embodiments of the present invention still use a 511-bit Gold code serving as the first spread spectrum signal as an example for illustration. The duration of the first spread spectrum signal is 33.8 μs, and the duration of the generated spread spectrum modulation signal is 102.2 μs. Referring to FIG. 6, the duration of one frame is 1 s, each frame has 40 time slots, and the spread spectrum modulation signal and the first spread spectrum signal are inserted within the duration of the TXID signal and the first 100 μs of the first synchronization signal. Preferably, within the remaining duration of the first synchronization signal, another spread spectrum modulation signal and another spread spectrum code may also be inserted. To be specific, a preset number of spread spectrum modulation signals or a preset number of first spread spectrum signals may be inserted, or first synchronization signals may be fully inserted, which is not limited in this embodiment.

Furthermore, the inserting and framing module 505 is further configured to: according to the first spread spectrum signal generated by the spread spectrum generation module 503, cyclically superpose the first spread spectrum signal within the entire time segment of the second synchronization signal and the OFDM signal in each time slot of the generated broadcast positioning signal. The first spread spectrum signal is superposed over the broadcast positioning signal concurrently, which does not affect the waveform of the broadcast positioning signal. In this way, the broadcast positioning signal and the cyclically superposed first spread spectrum signal are broadcast concurrently, so that the receiver receives the cyclically superposed first spread spectrum signal and thus accurate positioning is implemented.

Preferably, the spread spectrum code generation module 503 in the embodiments of the present invention is further configured to generate a second spread spectrum code.

Furthermore, the inserting and framing module 505 is further configured to: according to the second spread spectrum code generated by the spread spectrum generation module 503, cyclically superpose the first spread spectrum signal within the entire time segment of the second synchronization signal and the OFDM signal in each time slot of the generated broadcast positioning signal. The second spread spectrum code is superposed over the broadcast positioning signal concurrently, which does not affect the waveform of the broadcast positioning signal. In this way, the broadcast positioning signal and the cyclically superposed second spread spectrum code are broadcast concurrently, so that the receiver receives the cyclically superposed second spread spectrum code and thus accurate positioning is implemented.

Furthermore, the apparatus for generating a broadcast positioning signal further includes a clock and synchronization module 506, configured to send a synchronization signal to the coding and modulation module 502, or send a rubidium atomic clock signal to the coding and modulation module 502, or send a timing signal to the coding and modulation module 502.

Specifically, the synchronization signal may use an atomic clock or/and high-precision time mark of the national timing center, where the high-precision time mark is acquired from a satellite. The clock and synchronization module 506 is arranged in the apparatus for generating a broadcast positioning signal, and hence of the broadcast signal is framed and a CDMA positioning signal is accurately inserted. Preferably, the synchronization signal sent by the clock and synchronization module 506 uses a rubidium atomic clock, and the clock and synchronization module is capable of implementing accurate time synchronization of the insertion of the positioning signal. Alternatively, the synchronization signal sent by the clock and synchronization module 506 uses a high-precision time mark of the national timing center as a timing signal, and the clock and synchronization module is capable of outputting a broadcast positioning signal exceeding the 10-ns high-precision positioning requirement.

Furthermore, the apparatus for generating a broadcast positioning signal further includes an insertion control module 507, which is electrically connected to the inserting and framing module 505, and is configured to control the inserting and framing module 505 to ensure strict time synchronization between broadcasting and transmission of the broadcast positioning signal.

Furthermore, the apparatus for generating a broadcast positioning signal further includes a power module, which is electrically connected to the coding and modulation module 502, the spread spectrum code generation module 503, the spread spectrum modulation module 504, the inserting and framing module 505, the clock and synchronization module 506, and the insertion control module 507, and is configured to supply power to the apparatus for generating a broadcast positioning signal.

The apparatus for generating a broadcast positioning signal provided in the embodiments of the present invention can be applied in the method for generating a broadcast positioning signal. A broadcast positioning signal is generated after the inserting and framing module inserts a spread spectrum modulation signal and a first spread spectrum signal. Since the spread spectrum modulation signal is inserted in the OFDM signal and the broadcast positioning signal is generated, a receiver is capable of accurately capturing and tracing the broadcast positioning signal, thereby implementing the positioning function. Meanwhile, the unmodulated first spread spectrum signal is inserted in the OFDM signal, and hence subsequently inserted spread spectrum codes are isolated, thereby preventing interference between signals.

Embodiment 6

Figure 7:
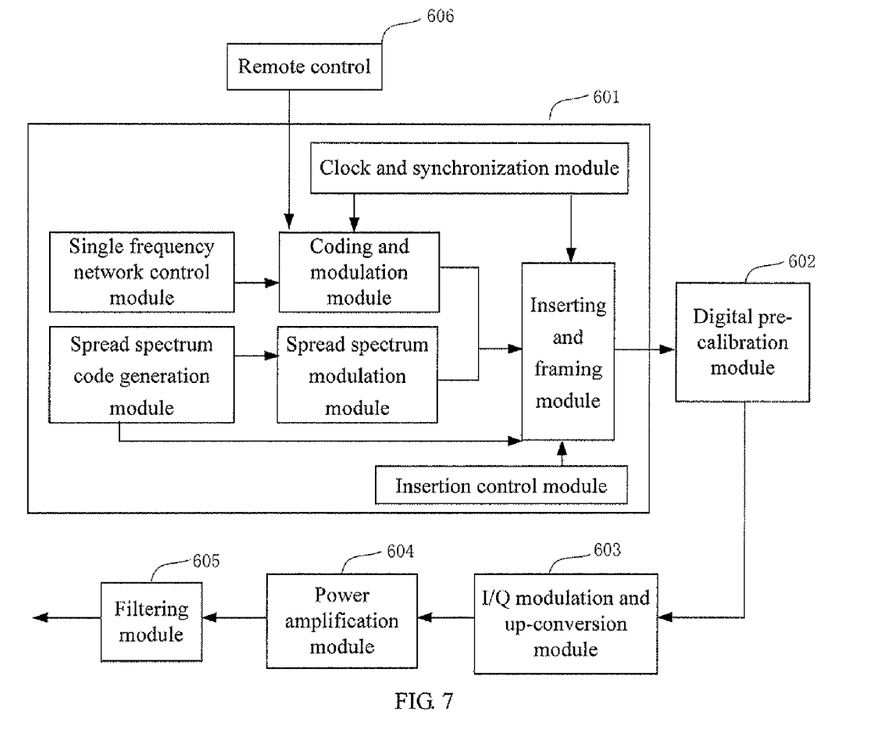
FIG. 7 is a schematic structural diagram of an exciter according to Embodiment 6 of the present invention.

Referring to FIG. 7, an embodiment of the present invention provides an exciter, wherein the exciter includes any above mentioned apparatus 601 for generating a broadcast positioning signal, and further includes:

a digital pre-calibration module 602, configured to pre-calibrate a broadcast positioning signal generated by the apparatus 601 for generating a broadcast positioning signal.

Specifically, since the OFDM multicarrier modulation technology is used in the apparatus for generating a broadcast positioning signal 601, the output signal has a high peak-to-average ratio. In practical circuit implementation, units for signal modulation, frequency conversion, and power amplification have a limited dynamic range, and therefore non-linear distortion tends occur. Therefore, by arranging the digital pre-calibration module 602 in the exciter, pre-distortion processing is performed on the received broadcast positioning signal, non-linear distortion caused by the amplification part is offset, and non-linear amplitude distortion and phase distortion caused by the radio frequency power amplification at the rear end are compensated, thereby effectively improving linearity of the radio frequency amplification. Through the non-linear calibration, under the same quality index of the output signal, the larger power can be output or the desired output power can be acquired by using a smaller power amplifier, and the quality of the output signal is effectively improved. Meanwhile, power usage efficiency of the power amplifier is improved, power consumption is reduced, heat production is mitigated, and reliability is enhanced.

Furthermore, the exciter further includes an in-phase/quadrature (I/Q) modulation and up-conversion module 603, a power amplification module 604, and a filtering module 605.

The I/Q modulation and up-conversion module 603 is configured to perform I/Q modulation and up-conversion on the pre-calibrated broadcast positioning signal sent by the digital pre-calibration module 602 to generate an analog radio frequency signal. Specifically, the broadcast positioning signal after digital pre-calibration is processed with digital-to-analog conversion, and is directly modulated to the medium frequency, and the media frequency signal passes through a surface wave filter and then is processed up-conversion, to generate the analog radio frequency signal on a desired channel.

The power amplification module 604 is configured to perform power amplification on the analog radio frequency signal sent by the I/Q modulation and up-conversion module 603 to output a radio frequency signal. Specifically, the embodiments of the present invention use pressure-controlled electrical modulation attenuator to adjust the power, the power amplification module 604 is an intelligent universal module, a controller achieves the object of power adjustment only by adjusting a register using an I2C bus. Preferably, the power amplification module 604 uses, when outputting the radio frequency signal, quick-loop and slow-loop automatic level control (ALC), which greatly enhances stability of the output power.

The filtering module 605 is configured to filter the radio frequency signal sent by the power amplification module 604, and output the filtered radio frequency signal. The filtering module 605 may be a low-pass filter, or a band-pass filter, and mainly filters high-order harmonics in the radio frequency signal.

Furthermore, the exciter further includes a remote control module 606, which is electrically connected to the coding and modulation module in the apparatus 601 for generating a broadcast positioning signal, and is configured to control working status of the exciter. Specifically, the remote control module 606 mainly controls the data streams input to the exciter, the signal processing in the exciter, and the output analog signals. The interface mode of remote control module 606 includes an RS-232 interface and an Ethernet interface capable of connecting to the Internet.

Furthermore, the exciter further includes a power module, which is electrically connected to the apparatus for generating a broadcast positioning signal 601, the digital pre-calibration module 602, the I/Q modulation and up-conversion module 603, the power amplification module 604, and the filtering module 605 of the exciter, and is configured to supply power to the exciter.

In practical applications, idle period downlink (IPDL) may be used. For example, base stations are categorized into three groups according to the network topology: group 1, group 2, and group 3. Each group of base stations suspends transmitting the broadcast positioning signal in turns by using the exciter. The corresponding receiver detects broadcast positioning signals transmitted by other base stations within this period of time, i.e., within the suspension of transmission of the broadcast positioning signal. Therefore, interference between strong signals and weak signals is prevented.

The exciter provided in the embodiments of the present invention can be applied in the method for generating a broadcast positioning signal. A broadcast positioning signal is generated by the apparatus for generating a broadcast positioning signal, pre-calibration, I/Q modulation, and up-conversion are performed on the broadcast positioning signal. In this way, the exciter implements the accurate positioning function, and provides accurate positioning information and navigation information for a mobile terminal in the CMMB/DAB mobile broadcast system. When the receiver is a mobile terminal, the mobile terminal implements the function of positioning and navigation while modulating the mobile multimedia broadcasting. According to the embodiments of the present invention, the high-precision broadcast positioning signal is compatible with the original broadcast system, the mobile broadcast receiving function of the mobile terminal in the original system is not affected, the high-precision broadcast positioning signal can be provided for the mobile terminal, and 10-ns-less high-precision time synchronization-based positioning is achieved. In this way, wide-area high-precision positioning and navigation of vast mobile terminals can be implemented.

Embodiment 7

Figure 8:
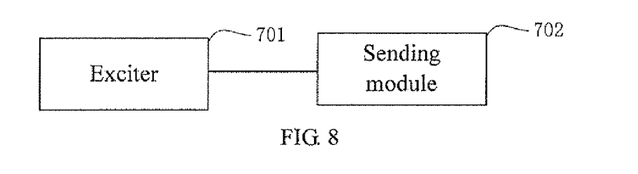
FIG. 8 is a schematic structural diagram of a transmitter according to Embodiment 7 of the present invention.

Referring to FIG. 8, an embodiment of the present invention provides a transmitter, where the transmitter includes an exciter 701 according to the above embodiments, and further includes:

a transmitting module, configured to transmit a broadcast positioning signal pre-calibrated by the exciter 701.

The transmitter provided in the embodiments of the present invention can be applied in the method for generating a broadcast positioning signal, and provides accurate positioning information and navigation information for a mobile terminal in the CMMB/DAB mobile broadcast system by sending the pre-calibrated broadcast positioning signal. The mobile terminal implements the function of positioning and navigation while modulating the mobile multimedia broadcasting. According to the embodiments of the present invention, the high-precision broadcast positioning signal is compatible with the original broadcast system, the mobile broadcast receiving function of the mobile terminal in the original system is not affected, the high-precision broadcast positioning signal can be provided for the mobile terminal, and 10-ns-less high-precision time synchronization-based positioning is achieved. In this way, wide-area high-precision positioning and navigation of most mobile terminal can be implemented.

Embodiment 8

Figure 9:
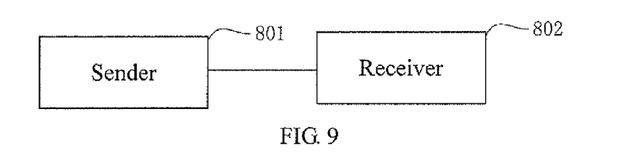
FIG. 9 is a schematic structural diagram of a positioning system according to Embodiment 8 of the present invention.

Referring to FIG. 9, an embodiment of the present invention provides a positioning system, where the positioning system includes a plurality of senders 801 and one or more than one receiver 802.

The sender 801 is configured to store coordinates of the sender, generates a broadcast positioning signal, and broadcasts the signal.

The receiver 802 is configured to receive broadcast positioning signals broadcast by at least three different senders and coordinates of the three senders, and positions the receiver according to the principle of three-point positioning.

The sender 801 may be an apparatus for generating the broadcast positioning signal described in any of Embodiments 4 to 7, or may be an exciter capable of generating the broadcast positioning signal, or may be a transmitter capable of generating the broadcast positioning signal. The receiver 802 may be a mobile terminal or a mobile phone. The embodiments of the present invention do not limit the sender 801 and the receiver 802.

In the positioning system provided in the embodiments of the present invention, a receiver receives broadcast positioning signals broadcast by at least three senders, and coordinates of the three senders, and hence a receiver is positioned according to the principle of three-point positioning.

It should be noted that, the apparatus for generating a broadcast positioning signal, the exciter, and the transmitter according to the above embodiments are described by only using division of the above functional modules for description. In practice, the functions may be assigned to different functional modules for implementation as required. To be specific, the internal structure of the apparatus is divided into different functional modules to implement all or part of the above-described functions. In addition, the method for generating a broadcast positioning signal provided in the above embodiment and the apparatus for generating a broadcast positioning signal pertain to the same concept. For detailed implementation, reference may be made to the apparatus embodiment, which is not described here any further.

It is understandable to those skilled in the art that all or part steps of the preceding methods can be implemented by hardware following instructions of programs. The programs may be stored in a computer readable storage medium. The storage medium may be a hard disk, a compact disk-read only memory (CD-ROM), and a floppy disk of a computer.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A method for generating a broadcast positioning signal, comprising:
   receiving a data stream, performing forward error correction coding and orthogonal frequency-division multiplexing (OFDM) modulation on the data stream, and generating an OFDM signal and a first spread spectrum signal;
   performing spread spectrum modulation on preset message bit information according to the first spread spectrum signal to generate a spread spectrum modulation signal; and
   inserting one or more than one spread spectrum modulation signal and one or more than one first spread spectrum signal in a transmitter identifier signal and a first synchronization signal in each time slot of the OFDM signal, to generate a broadcast positioning signal.

2. The method according to claim 1, wherein the inserting one or more than one spread spectrum modulation signal and one or more than one first spread spectrum signal in a transmitter identifier signal and a first synchronization signal in each time slot of the OFDM signal, to generate the broadcast positioning signal specifically comprises:
   padding a preset number of spread spectrum modulation signals in the transmitter identifier signal and the first synchronization signal in each time slot of the OFDM signal, and inserting the first spread spectrum signal.

3. The method according to claim 1, further comprising:
   performing pre-calibration and digital-to-analog conversion on the broadcast positioning signal to obtain an analog radio frequency signal; and
   performing power amplification on the analog radio frequency signal to generate a radio frequency signal, and filtering the radio frequency signal.

4. A positioning method using the method for generating the broadcast positioning signal according to claim 1, comprising:
   generating, by a sender, the broadcast positioning signal, and broadcasting the broadcast positioning signal; and
   positioning, by a receiver, the receiver according to the broadcast positioning signals broadcasted by at least three different senders and coordinates of the three different senders.

5. An apparatus for generating a broadcast positioning signal, comprising:
   a coding and modulation module, configured to receive a data stream, and perform forward error correction coding and orthogonal frequency-division multiplexing (OFDM) modulation on the data stream to generate an OFDM signal;
   a spread spectrum code generation module, configured to generate a first spread spectrum signal;
   a spread spectrum modulation module, configured to perform spread spectrum modulation on preset message bit information according to the first spread spectrum signal to generate a spread spectrum modulation signal; and
   an inserting and framing module, configured to: receive the OFDM signal sent by the coding and modulation module, the first spread spectrum signal sent by the spread spectrum code generation module, and the spread spectrum modulation signal sent by the spread spectrum modulation module; and insert one or more than one spread spectrum modulation signal and one or more than one first spread spectrum signal in a transmitter identifier signal and a first synchronization signal in each time slot of the OFDM signal, to generate a broadcast positioning signal.

6. The apparatus according to claim 5, wherein the inserting and framing module specifically comprises:
   a receiving unit, configured to receive the OFDM signal sent by the coding and modulation module, the first spread spectrum signal sent by the spread spectrum code generation module, and the spread spectrum modulation signal sent by the spread spectrum modulation module; and
   a generation unit, configured to pad a preset number of spread spectrum modulation signals in the transmitter identifier signal and the first synchronization signal in each time slot of the OFDM signal, and insert the first spread spectrum signal to generate the broadcast positioning signal.

7. The apparatus according to claim 5, further comprising a clock and synchronization module, configured to send a synchronization signal to the coding and modulation module, or send a rubidium atomic clock signal to the coding and modulation module, or send a timing signal to the coding and modulation module.

8. An exciter, comprising:
   an apparatus for generating a broadcast positioning signal; and
   a digital pre-calibration module, configured to pre-calibrate a broadcast positioning signal generated by the apparatus for generating a broadcast positioning signal;
   the apparatus for generating a broadcast positioning signal comprising:
   a coding and modulation module, configured to receive a data stream, and perform forward error correction coding and orthogonal frequency-division multiplexing (OFDM) modulation on the data stream to generate an OFDM signal;
   a spread spectrum code generation module, configured to generate a first spread spectrum signal;
   a spread spectrum modulation module, configured to perform spread spectrum modulation on preset message bit information according to the first spread spectrum signal to generate a spread spectrum modulation signal; and
   an inserting and framing module, configured to: receive the OFDM signal sent by the coding and modulation module, the first spread spectrum signal sent by the spread spectrum code generation module, and the spread spectrum modulation signal sent by the spread spectrum modulation module; and insert one or more than one spread spectrum modulation signal and one or more than one first spread spectrum signal in a transmitter identifier signal and a first synchronization signal in each time slot of the OFDM signal, to generate a broadcast positioning signal.

9. The exciter according to claim 8, further comprising:
   an in-phase/quadrature modulation and up-conversion module, configured to perform in-phase/quadrature modulation and up-conversion on the pre-calibrated broadcast positioning signal sent by the digital pre-calibration module to generate an analog radio frequency signal;
   a power amplification module, configured to perform power amplification on the analog radio frequency signal sent by the in-phase/quadrature modulation and up-conversion module to output a radio frequency signal; and
   a filtering module, configured to filter the radio frequency signal sent by the power amplification module.

10. A transmitter, comprising:

an exciter; and a transmitting module, configured to transmit a broadcast positioning signal pre-calibrated by the exciter;

the exciter comprising:

an apparatus for generating a broadcast positioning signal; and a digital pre-calibration module, configured to pre-calibrate a broadcast positioning signal generated by the apparatus for generating a broadcast positioning signal;

the apparatus for generating a broadcast positioning signal comprising:

a coding and modulation module, configured to receive a data stream, and perform forward error correction coding and orthogonal frequency-division multiplexing (OFDM) modulation on the data stream to generate an OFDM signal;

a spread spectrum code generation module, configured to generate a first spread spectrum signal;

a spread spectrum modulation module, configured to perform spread spectrum modulation on preset message bit information according to the first spread spectrum signal to generate a spread spectrum modulation signal; and an inserting and framing module, configured to: receive the OFDM signal sent by the coding and modulation module, the first spread spectrum signal sent by the spread spectrum code generation module, and the spread spectrum modulation signal sent by the spread spectrum modulation module; and insert one or more than one spread spectrum modulation signal and one or more than one first spread spectrum signal in a transmitter identifier signal and a first synchronization signal in each time slot of the OFDM signal, to generate a broadcast positioning signal.

\* \* \* \* \*